United States Patent [19]

Heath

[11] 4,023,334

[45] May 17, 1977

[54] MOWING MACHINE

[76] Inventor: Harry Charles Heath, 8930 Burgess Road, Colorado Springs, Colo. 80908

[22] Filed: Dec. 26, 1973

[21] Appl. No.: 428,330

[52] U.S. Cl. .............................................. 56/297
[51] Int. Cl.² .................................... A01D 55/02
[58] Field of Search ............. 56/296, 297, 275, 257

[56] References Cited

UNITED STATES PATENTS

| 671,024 | 4/1901 | Long | 56/297 |
|---|---|---|---|
| 738,033 | 9/1903 | Haynes | 56/297 |
| 2,345,383 | 3/1944 | Curtis | 56/296 X |
| 3,108,421 | 10/1963 | Leverenz | 56/297 |
| 3,203,162 | 8/1965 | Blaauw et al. | 56/297 |
| 3,246,461 | 4/1966 | Wood | 56/297 |

Primary Examiner—Russell R. Kinsey

[57] ABSTRACT

A mower using two knives which counterbalance one another and which can be removed from, and replaced in, the machine manually by an operator positioned behind the cutter bar: and which can operate throughout an arc of the cutter bar from substantially vertical above the horizontal to substantially vertical below the same; said knives and their co-operational components being protected from extraneous matter with the exception of the essentially exposed shearing elements.

1 Claim, 6 Drawing Figures

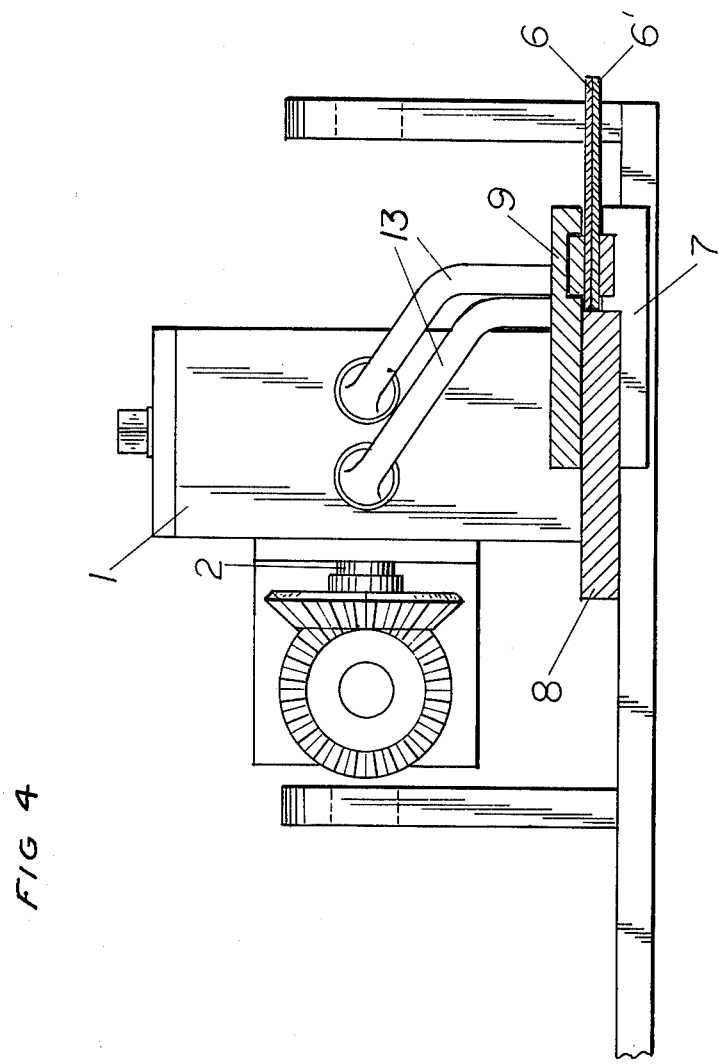

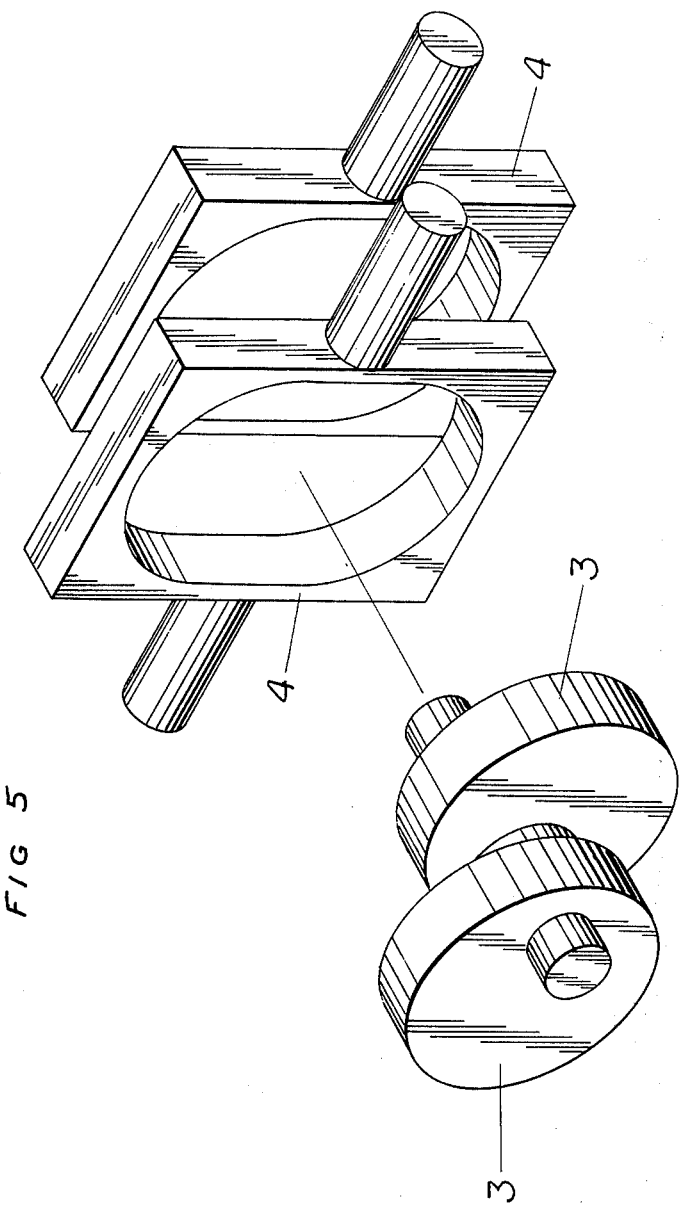

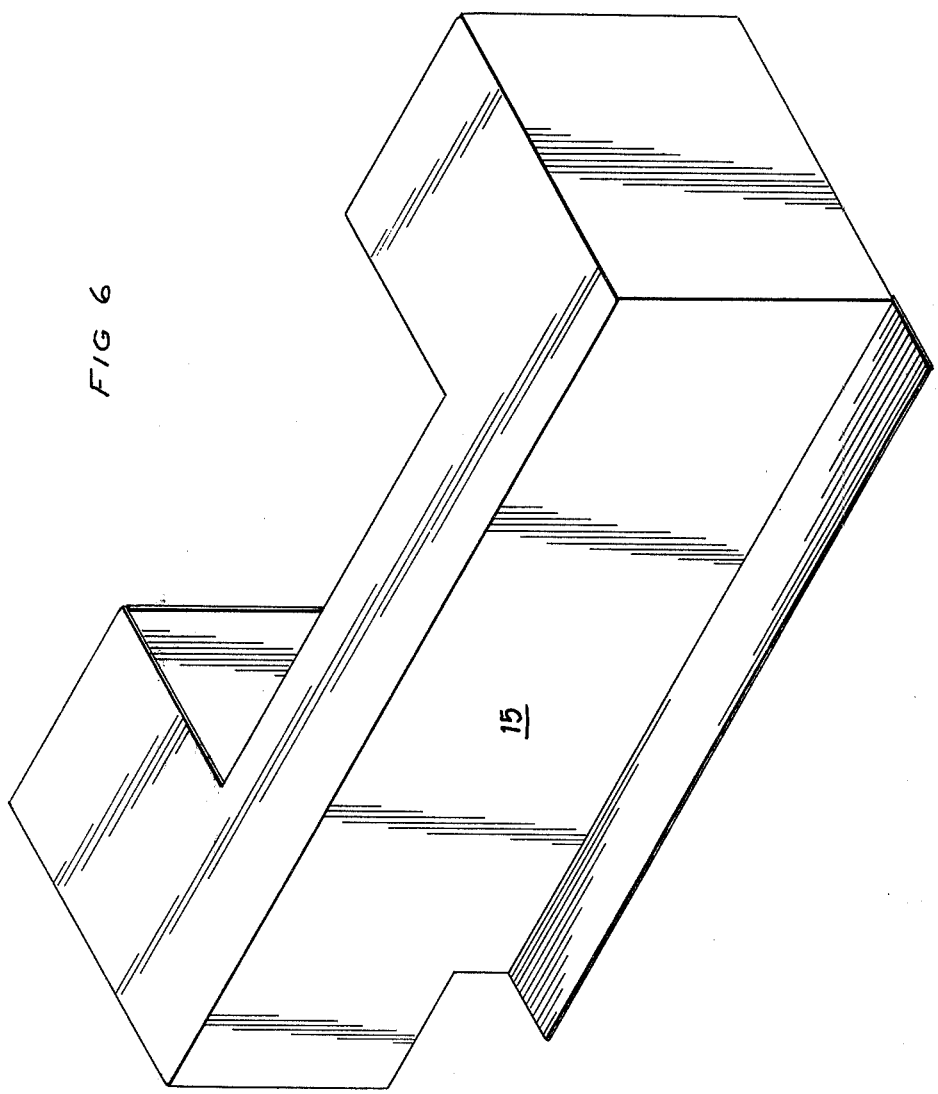

MOWING MACHINE

All mowing machines hitherto disclosed require that the knife be withdrawn through the full length of the cutter bar and replaced the same way necessitating that the operator be positioned on the ground between the team and the mower, or beneath or behind the tractor: these conditions are both difficult and dangerous thus the applicant's machine is designed to obviate them and, further, to eliminate the need for one or more tools to attach or detach the knives as has hitherto been required.

Most mowing machines hitherto disclosed are unable to efficiently operate at any angle other than substantially horizontal. Applicant's machine is so designed as to permit efficient operation through an arc of the cutter bar sufficient for mowing steeply sloping terrain both above and below the horizontal.

SUMMARY

The knives are impelled in opposite directions throughout their operation by reciprocating members that are operated by cams on a driven shaft that is co-axial with the pivot points of a substantially conventional inner shoe of the machine; brackets on the knives transmit motion from the said members to the knives.

The lower knife lies in a track along the front edge of the substantially conventional knifeboard and makes shearing contact of its sections with those of the upper knife which is held in its working position by a suitably formed retainer that covers its entire length and is located by suitable means on the knifeboard and is locked there by a flat spring, or other suitable device, and which, in conjunction with a cover on the inner shoe, protects the moving parts throughout the operating range of the cutter bar.

VIEWS OF DRAWINGS

FIG. 4 is a section view of the cutter bar showing the track, the retainer and brackets: also the co-axiality of the driven shaft with the pivot points of the shoe.

FIG. 5 is a exploded view, in perspective, of the driven shaft of the transfer case with its cams and the sliding members which they motivate.

FIG. 6 shows, in perspective, a cover to protect the pins and brackets from extraneous elements.

DETAILED DESCRIPTION

Figure 1:
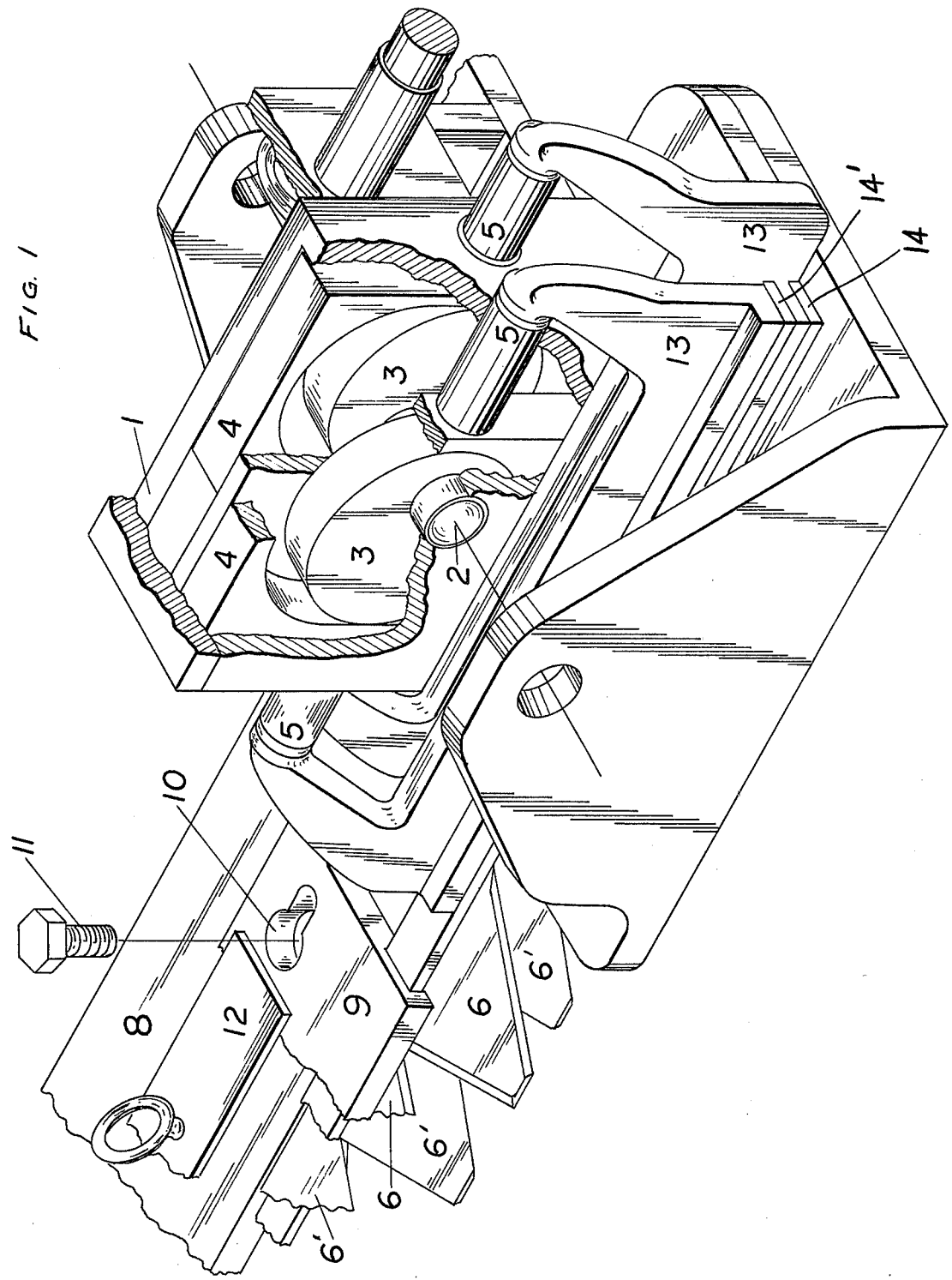
FIG. 1 is a perspective view showing relative positions of the transfer case (partly broken away), shoe and knifeboard and the means of transmitting motion from transfer case to knives.
Figure 2:
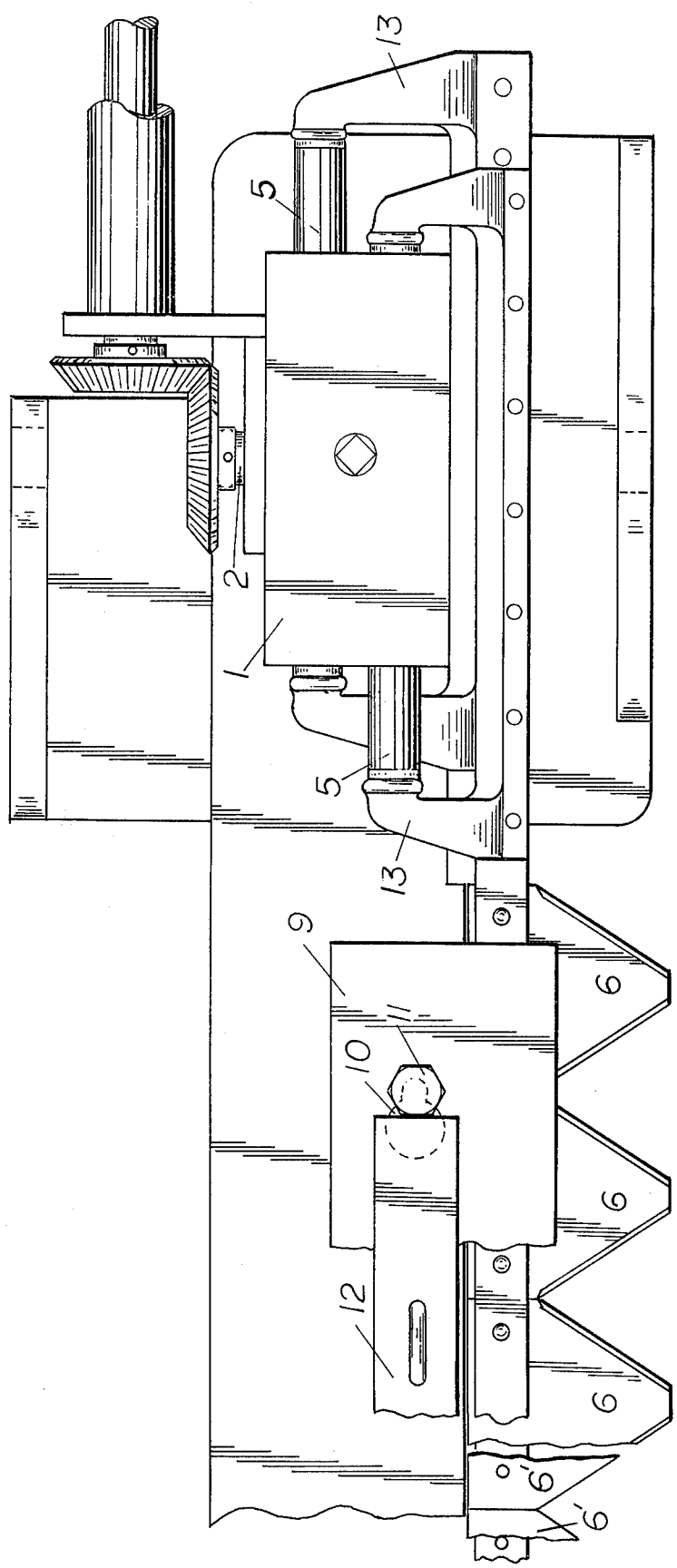
FIG. 2 is a plan of a portion of the cutter bar showing relation of transfer case to its power source and the knives it activates also in its co-axiality with the pivot points of the shoe.
Figure 3:
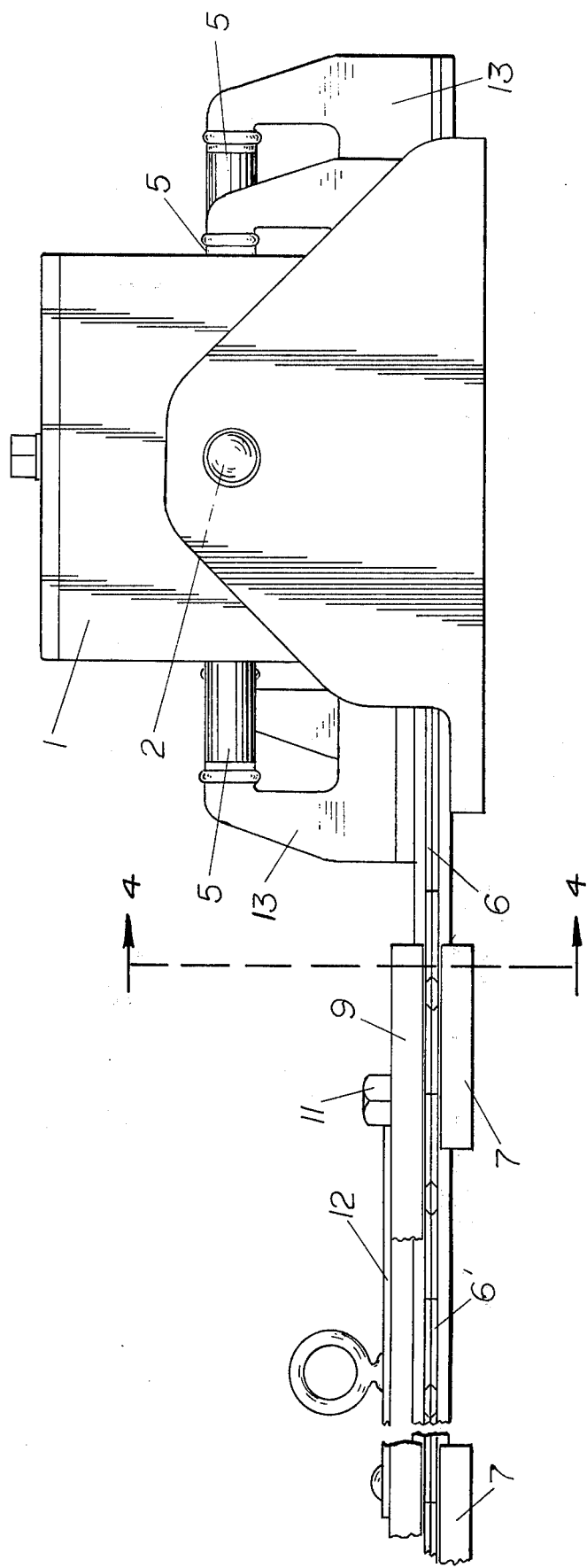
FIG. 3 is front elevation of portion of cutter bar embodying the inner shoe of the machine, the track, knives, retainer and retainer locking spring.

The transfer case 1, which is oil-retentive, is attached to the knifeboard and houses the driven shaft 2, whose diametrically opposed cams 3, engage the sliding members 4 and reciprocate them when power is applied to shaft 2, said cams may be furnished with antifriction bearings around their circumferences. Each sliding member carries two axially opposed pins 5 which project through openings in the transfer case and which, when the machine is assembled for operation, are in contact with the brackets 13 that are attached to the knife ribs 14 and 14' and through which the knives 6 and 6' are reciprocated. The lower knife 6' lies in the track 7 which may be of one piece or several and which is attached to the knifeboard 8 by any suitable means such as bolts in threaded holes, bolts in smooth holes locked by nuts, welding or by integral construction with 8. The upper knife 6 is held in operating position by the retainer 9 which is located on the knifeboard by its keyhole slots 10 engaging the suitably formed bolts 11 which are affixed in the knifeboard. It is removed from the cutter bar by sliding it until the bolts 11 are concentric with the large holes of the keyhole slots when it may be lifted; it is replaced by reversing the procedure and is then locked in operating position by the flat spring 12 or other suitable device.

The cover 15 FIG. 6: protects the pins and the brackets from extraneous elements encountered during operation of the machine and it may be of such shape and dimensions as may be found to be desirable to accomplish this objective. It is attached to the transfer case by suitable means. In a machine requiring a fixed cutter bar, as a lawn mower type for example, the transfer case may be located at any required point on the knifeboard and in any desired position relative to the horizontal.

I claim:
1. A cutting assembly comprising a knifeboard, two coacting cutter bars, one above the other, lower supporting and guide means and upper guide means mounting said cutter bars on said knifeboard, a substantially horizontal driven shaft supported by said knifeboard adjacent one end thereof, two eccentric cams mounted on said driven shaft, means connecting each of said cams with one of said cutter bars such that the cutter bars reciprocate in opposite directions when the shaft is driven, said shaft being aligned coaxially with pivotal mounting means that permit the entire cutting assembly to assume positions above and below the horizontal during operation, said knifeboard being provided with upstanding bolts, said upper guide means having keyhole slots, the narrow portions of said slots surrounding said bolts when assembled and means locking or securing said upper guide means in the position wherein the narrow portions of said slots do surround the bolts.

* * * * *